(12) United States Patent
Hoy et al.

(10) Patent No.: US 9,356,937 B2
(45) Date of Patent: May 31, 2016

(54) DISAMBIGUATING CONFLICTING CONTENT FILTER RULES

(71) Applicant: International Business Machines Corporation, Armonk, NY (US)

(72) Inventors: Jeffrey Robert Hoy, Southern Pines, NC (US); Shadi Eskamaei Albouyeh, Raleigh, NC (US); Bernadette Alexia Carter, Raleigh, NC (US); Stephanie Lynn Trunzo, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 21 days.

(21) Appl. No.: 14/078,685

(22) Filed: Nov. 13, 2013

(65) Prior Publication Data

US 2015/0135256 A1   May 14, 2015

(51) Int. Cl.
*H04L 29/06*   (2006.01)

(52) U.S. Cl.
CPC .......... *H04L 63/101* (2013.01); *H04L 63/0227* (2013.01); *H04L 63/0263* (2013.01); *H04L 63/20* (2013.01)

(58) Field of Classification Search
CPC ... H04L 12/585; H04L 51/12; H04L 63/0227; H04L 63/0245
USPC ............................................................ 726/1
See application file for complete search history.

(56) References Cited

U.S. PATENT DOCUMENTS 7,818,794 B2 * 10/2010 Wittman ............... G06F 21/554
                                                                    380/266
7,849,507 B1   12/2010 Bloch et al.
(Continued)

FOREIGN PATENT DOCUMENTS

WO   WO2006061826   6/2006

OTHER PUBLICATIONS

Delort, et al, "Automatic Moderation of Online Discussion Sites", International Journal of Electronic Commerce, vol. 15, No. 3, pp. 9-30, Spring 2011.
(Continued)

*Primary Examiner* — Linglan Edwards
(74) *Attorney, Agent, or Firm* — David B. Woycechowsky; David H. Judson (57) ABSTRACT

A content filtering mechanism is enhanced to resolve conflicts in filtering rules (e.g., those created by a whitelist, on the one hand, and a blacklist, on the other hand). Preferably, a conflict between or among content filtering rules is resolved by selecting among conflicting rules based on a notion of "risk" associated with the rules. According to this risk-based approach, when two or more rules conflict with one another, the particular rule whose risk value has a predetermined relationship (e.g., aligns most closely) with a risk level associated with the application (applying the rules) then takes precedence. By selecting among conflicting rules based on risk, the potential or actual conflicts are disambiguated, with the result being that the content is filtered appropriately.

17 Claims, 4 Drawing Sheets

(56) References Cited

U.S. PATENT DOCUMENTS

| | | | | |
|---|---|---|---|---|
| 7,917,951 | B1* | 3/2011 | Tarbotton | G06Q 10/107 |
| | | | | 713/188 |
| 8,478,764 | B2* | 7/2013 | Norton | G06N 5/025 |
| | | | | 380/39 |
| 8,510,839 | B2* | 8/2013 | Tarbotton | G06Q 10/107 |
| | | | | 726/22 |
| 2005/0198692 | A1 | 9/2005 | Zurko et al. | |
| 2008/0320577 | A1* | 12/2008 | Larduinat | 726/9 |
| 2010/0325164 | A1* | 12/2010 | Norton | G06F 17/30289 |
| | | | | 707/797 |
| 2011/0173677 | A1* | 7/2011 | Tarbotton et al. | 726/3 |
| 2012/0278163 | A1 | 11/2012 | Spivack et al. | |

OTHER PUBLICATIONS

Barracuda Networks Inc., "Barracuda Web Filter Administrator's Guide 5.0"; 2004-2012.

Barracuda Networks Inc, "Barracuda Spam & Virus Firewall Administrator's Guide 5.0"; 2004-2011.

* cited by examiner

FIG. 5
```
<rule tag='script' action='remove-tag' />
<rule tag='link' attribute='rel' value='stylesheet' value-criterion='contains' action='remove-tag' />
<rule attribute='src' value='javascript' value-criterion='contains' action='remove-attribute-value' />
```

FIG. 6
```
<rule tag='b' action='pass-tag' passAttributes='none' />
<rule tag='img' action='pass-attribute' passAttributes='all' />
<rule tag='link' attribute='href' value='ibm.com' value-criterion='contains' action='pass-attribute' />
```

FIG. 7
```
<b>Lorem ipsum dolor sit amet <b>
<br>
<table border=0 width=800><tr><td align=center>
<link rel="stylesheet" href="http://www.ibm.com/socialbusiness.css>consectetur adipisicing elit <link><td></tr></table>
<IMG SRC="javascript:alert ('Remember November!!'),">
sed do eiusmod tempor incididunt ut labore et dolore magna aliqua
```

FIG. 8
```
<b>Lorem ipsum dolor sit amet <b>
<br>
<link href="http://www.ibm.com/socialbusiness>consectetur adipisicing elit <link>
<table border=0 width=800><tr><td align=center>
<link rel="stylesheet" href="http://www.ibm.com/socialbusiness.css>consectetur adipisicing elit <link><td></tr></table>
<IMG SRC="javascript:alert ('Remember November!!'),">
sed do eiusmod tempor incididunt ut labore et dolore magna aliqua
```

FIG. 9
```
<b>Lorem ipsum dolor sit amet <b>
<br>
<table border=0 width=800><tr><td align=center>
<link rel="stylesheet" href="http://www.ibm.com/socialbusiness.css>consectetur adipisicing elit <link><td></tr></table>
<IMG SRC="javascript:alert ('Remember November!!'),">
sed do eiusmod tempor incididunt ut labore et dolore magna aliqua
```

DISAMBIGUATING CONFLICTING CONTENT FILTER RULES

BACKGROUND OF THE INVENTION

1. Technical Field

This disclosure relates generally to content filtering.

2. Background of the Related Art

Unsolicited commercial email, commonly known as "spam," clogs mail servers and e-mail inboxes. Most existing solutions to prevent spam today are based on a content filter, which examines the text of an e-mail and uses a set of rules to determine if the recipient might want to receive it. The rules include "blacklists" and "whitelists." Blacklists and whitelists are commonly used by software to filter content. For example, email spam filters may remove emails based on a blacklist of known keywords. Or, safe emails may be retained based on the IP address of the email sender. Often, both whitelist and blacklist rules will be applied together, theoretically for improved results. Such rules, however, may conflict with one another with no clear resolution. For example, how should a spam filter handle an email with a spam keyword (identified on a blacklist) but sent by a whitelisted server? Or, how should a filter handle content when the filter rules affect only portions of the content rather than the entire message? One known approach is to apply whitelists and blacklists sequentially (e.g., apply a whitelist, then apply a blacklist, or vice versa). Another approach is to implement a rules engine rather than an explicit blacklist or whitelist, where the engine implements a hierarchical tree of decision nodes, each of which may be a conditionally-applicable whitelist or blacklist action. The result is a chain of applied whitelist/blacklist actions. While these techniques provide some advantages, in effect they amount to multiple-pass filtering, which is computationally intensive and still may not resolve rule conflicts adequately. As a consequence, even when these advanced techniques are used, unwanted spam may pass the filter, and legitimate email may be incorrectly tagged as spam.

Email is a simplified case where the filter chooses only to allow or block the email. The problem of disambiguating conflicting content filtering rules is exacerbated when the filter is an active content filter (ACF). Active content filtering is a technique to protect a computing device from potentially harmful active content (i.e., programs or code) embedded in downloaded HTML. Downloading refers to transferring a document, a file, or information from a remote computing device to a local computing device. Such downloading can occur over a local area network or over a wide area network, such as the Internet. If unfiltered, active content in a downloaded document may perform unwanted or unauthorized (generally referred to as harmful) actions on the local computing device, with or without the user knowing. To protect the local computing device from such actions, it is known to parse the contents of an HTML document to syntactically identify items within the document that are considered harmful. These items can vary, not only syntactically (e.g., multiple tags), but also in terms of granularity (e.g., tags, attributes, or specific values within attributes and tags). A record of such items may be kept within an editable configuration file. When new, potentially harmful items become known, an administrator or user can edit the configuration file to include these new items. Thus, the protection of the local computing device is able to keep pace with the development of new, potentially harmful active content. Except for those edits to the configuration file, changes to client-side or server-side software are not required to upgrade the filtering capability of the active content filter to respond to new forms of active content.

In the ACF, portions of the HTML content will pass the filter while other portions will be removed. For these types of content filters, conflicting content filtering rules may create further unintended results.

BRIEF SUMMARY

According to this disclosure, conflicting filtering rules (e.g., those created by a whitelist, on the one hand, and a blacklist, on the other hand) are disambiguated. As used herein, disambiguation refers to a process of resolving conflicts (or removing the ambiguity) in the rules when they are applied concurrently (e.g., in a single pass content filter). Preferably, a conflict between or among content filtering rules is resolved by selecting among conflicting rules based on an assessment of "risk" associated with one or more of the conflicting rules. The nature of the "risk" assessment and its application (to resolve a rules conflict) may vary. In operation, the application (e.g., an email client) applying the rules has or is assigned a risk level (which may be numerical, or an attribute such as "high" or "low"), and one of more filtering rules has or is assigned its own risk value. When two or more rules conflict with one another, the particular rule whose risk value has a predetermined relationship (e.g., aligns most closely) with the risk level associated with the application then takes precedence. In one embodiment, the risk level for the application and the risk values associated with the rules are numerical, and the rule selection is based on which of a set of conflicting rules has a value that best aligns to the risk level. In another embodiment, the risk level for the application is an attribute (e.g., rule granularity) and the risk values associated with the rules are properties (e.g., "high" or "low" granularity); once again, the rule selection is based on which of the set of conflicting rules provides the appropriate degree of granularity.

By selecting among conflicting rules based on risk, the potential or actual conflicts are disambiguated, with the result being that the content is filtered appropriately.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which:

FIG. 5 illustrates a sample ACF blacklist from a default ruleset;

FIG. 6 illustrates a sample ACF whitelist from a default ruleset;

FIG. 7 illustrates a HTML post by a malicious user;

FIG. 8 illustrates the HTML post filtered using the blacklist only;

FIG. 9 illustrates the HTML post filtered using the whitelist only;

DETAILED DESCRIPTION OF AN ILLUSTRATIVE EMBODIMENT

Figure 1:
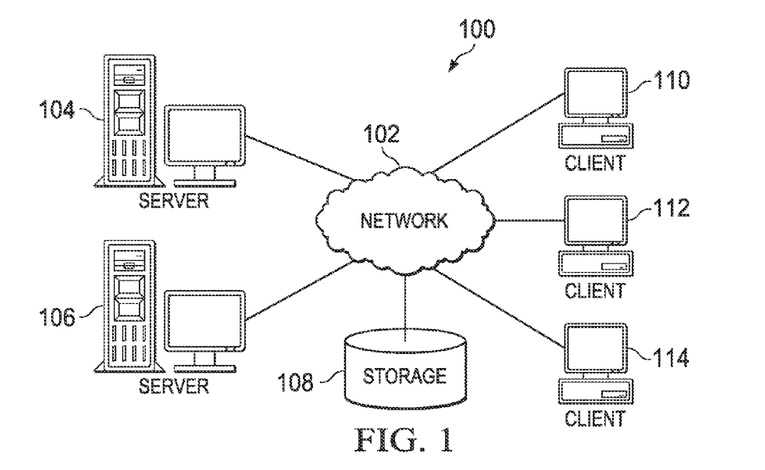
FIG. 1 depicts an exemplary block diagram of a distributed data processing environment in which exemplary aspects of the illustrative embodiments may be implemented.
Figure 2:
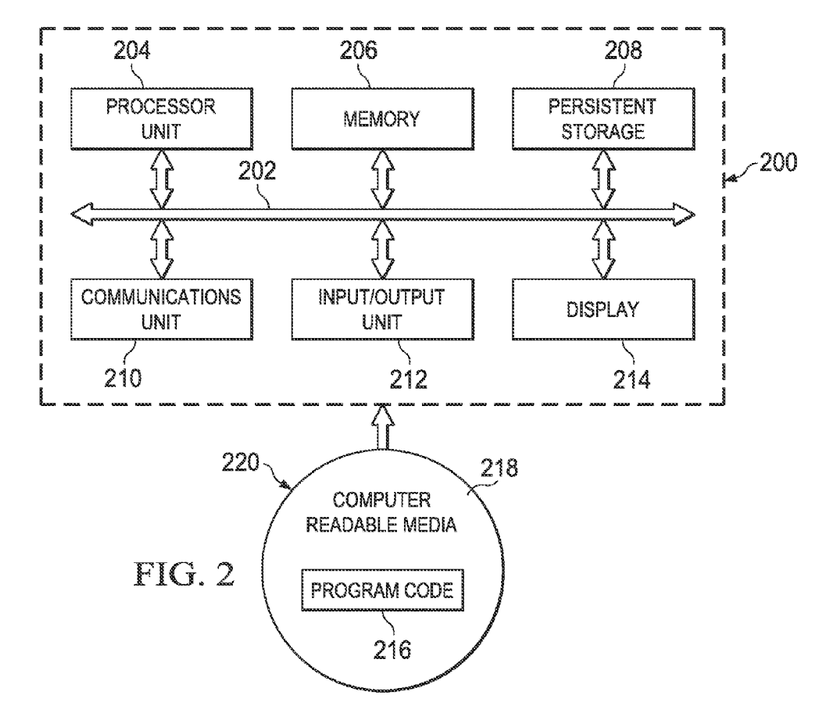
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Technologies With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 1 in which client machines communicate with an Internet-accessible cloud-based portal or application executing on a set of one or more machines. End users operate Internet-connectable devices (e.g., desktop computers, notebook computers, Internet-enabled mobile devices, or the like) that are capable of accessing and interacting with the portal or application. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

By way of additional background, many web pages or other network-delivered objects today contain active content for enhancing the experience of a user who downloads and displays a web page at a client computing device using client software, typically a browser or mobile app. In general, active content is a program or code transparently embedded in a downloaded document (e.g., hypertext markup language (HTML) defining a web page). The code automatically executes on the client computing device when the web page is downloaded, causing a type of action to occur. Most Web pages provide active content by including Java™ scripts, Java™ applets, Visual Basic® scripts, or Active X® controls in the HTML. When embedded within application level information, active content poses a security threat to the client computing device. For example, Java™ or JavaScript™ code placed within collaborative application data, such as mail messages, chat messages, and shared documents, can exploit vulnerabilities in the client software executing the code. These vulnerabilities include cross-site scripting (XSS) holes and gaps in the Java™ security model, which may assume that the host delivering the data vouches for it. By exploiting such vulnerabilities, an attacker can perform unauthorized operations, such as causing execution of malicious code, taking control of the user's session, and stealing information from the user's computing device.

Figure 3:
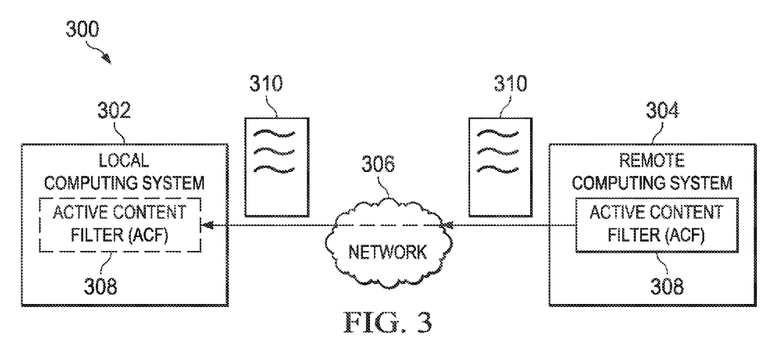
FIG. 3 is a block diagram of an embodiment of a networking system including an active content filter.

Active content filtering (ACF) is a known approach to address this security problem. FIG. 3 shows an embodiment of a network environment 300 in which active content is filtered. In addition to Web pages, active content can appear in a variety of other communications in the network environment 300, including email, chat messaging, applications, application development frameworks, collaborative frameworks, and collaborative applications. The network environment 300 includes a first computing system 302 and a second computing system 304 in communication with each other over a network 306. Example embodiments of the network 306 include, but are not limited to, the Internet, an intranet, a local area network (LAN), a wide area network (WAN), and a virtual private network (VPN). For convenience, the first computing system 302 is referred to as a local computing system and the second computing system 304 as a remote computing system. The first and second computing systems can also be referred to as client and server systems, respectively. In this approach, the network environment 300 includes an active content filter 308 for examining a document 310 to be presented to the local computing system 302 and removing potentially harmful active content before the document is displayed in the browser or other rendering engine. The document 310, for example, may be HTML in a mail message retrieved through the use of a WebMail application. WebMail applications enable users to read their electronic mil securely from a remote location using a Web browser. The ACF 308 also can be used to filter application content in other types of Web applications. In one embodiment, the ACF 308 is part of the remote computing system 304 and operates to filter the active content before the document 310 is transported over the network 300 to the local computing system 302. In another embodiment, the ACF 308 can instead be incorporated at the local computing system 302, as shown in phantom, e.g., in a Java 2, Enterprise Edition (J2EE) environment. In this embodiment, the remote computing system 304 transports the document 310 over the network 300 to the local computing system 302, and the ACF 308 at the local computing system examines the document before the document is executed or displayed.

Figure 4:
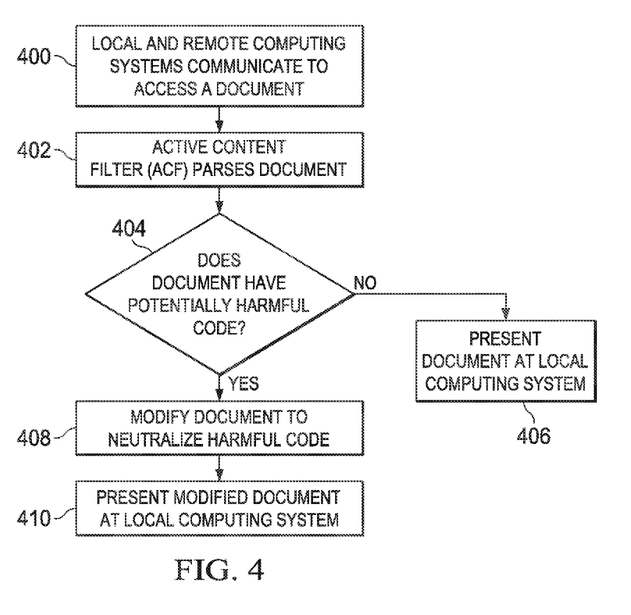
FIG. 4 is a process flow of a method to protect a computing system from potentially harmful active content in a document.

FIG. 4 illustrates how the ACF protects the computing system from active content in the document, typically HTML. The technique assumes that one or more definitions of potentially harmful active content are provided in an editable configuration file. At step 400, the local and remote computing systems communicate with one another, and the document is requested. At step 402, the active content filter parses the document. Depending on the ACF implementation, this parsing may occur at the remote computing system, or at the local computing system. During the parsing, the ACF determines whether the document contains potentially harmful active content by comparing the contents of the document with known descriptions or definitions of potentially harmful active con test is then performed at step 404 to determine whether the document has any potentially harmful active content. If not, the document is then presented at the local computing system. This is step 406. If, however, the outcome of the test at step 404 indicates that the document may have potentially harmful active content, the document is modified to neutralize the harmful code at step 408. The modified document is then presented at the local computing system at step 410.

Typically, an ACF includes a validating parser, an editable configuration file, a comparator, and a document code generator. The validating parser receives and input stream comprising the document. The parser includes program code for parsing the document, for determining whether the document is well-formed, for making repairs of malformed and faulty syntax, and for constructing a data-structure representation of the document (with any repairs). The configuration file is a text file that specifies those portions of a document that can contain active content. As a text file, an administrator is able to edit the text file using, for example, a text editor or word processing software. Adding or removing items from the configuration file changes the filtering behavior of the ACF. Each item specified in the configured file is sometimes referred to as an active content definition. Typically, the configuration file defines active content at various degrees of granularity. Active content to be filtered can be defined broadly at a tag level, more finely at an attribute level, and more finely still at a value level. Filtering also can be based on other criteria, such as based on signatures, user settings, and database settings. For each active content definition, the configuration file also specifies the action to be taken by the ACF (e.g., to remove the tag or the attribute from the document).

Content Filtering with Conflicting Rules

Figure 10:
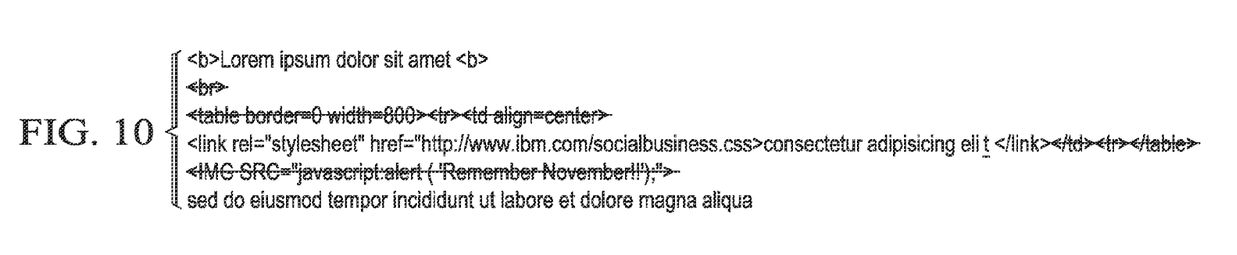
FIG. 10 illustrates the HTML post filtered with both the blacklist and the whitelist illustrating the potential conflict.

With the above as background, FIGS. 5-10 illustrate how conflicting filtering rules may create filtering ambiguities and thus raise potential security issues. A representative implementation is one wherein a combined whitelist/blacklist content filter is implemented in an ACF system, although this is not a limitation. In an example embodiment, it is assumed that the content filter has a default ruleset that includes both blacklists and whitelists. FIG. 5 illustrates a sample ACF blacklist from the default ruleset. FIG. 6 illustrates a sample ACF whitelist from the default ruleset. As can be seen, when these rules are applied concurrently, a rule conflict arises due to the varying treatment of the <link> tag. To see this conflict, consider an HTML post by a malicious user such as shown in FIG. 7. FIG. 8 illustrates this HTML post filtered using the blacklist only. FIG. 9 illustrates the HTML post filtered using the whitelist only. FIG. 10 illustrates the HTML post filtered with both the blacklist and the whitelist illustrating the potential conflict. In particular, in this example scenario, the "link" tag is both allowed by the whitelist and blocked by the blacklist.

Generalizing, the problem of conflicting (or "mutually exclusive" rules) typically arises when the application performs simultaneous whitelist and blacklist filtering and in which the whitelist says to allow the content (or some portion thereof) while the blacklist says to remove the content (or some portion thereof). Where the application would otherwise identify both rules as applicable, there must be a way to resolve ambiguities. A solution to this problem is now described.

Disambiguating Conflicting Rules in a Content Filter

With the above as background, the subject matter of this disclosure is now described.

According to this disclosure, conflicting filtering rules (e.g., those created by a whitelist, on the one hand, and a blacklist, on the other hand) are disambiguated. As used herein, disambiguation refers to a process of resolving conflicts (or removing the ambiguity) in the rules when they are applied concurrently (e.g., in a single pass content filter). Preferably, a conflict between or among content filtering rules is resolved by selecting among conflicting rules based on an assessment of "risk" associated with one or more of the conflicting rules. As will be described, the nature of the "risk" assessment and its application (to resolve a rules conflict) may vary. Accordingly, in the approach of this disclosure, it is assumed that the application (e.g., an email client) applying the rules has or is assigned a risk level (which may be numerical, or an attribute such as "high" or "low"). Further, one of more filtering rules has or is assigned its own risk value. The risk level of the application and the risk values associated with the rules may be pre-configured, assigned automatically or programmatically, or vary based on other factors (e.g., time of day, source of an originating request, role, and many others). According to this risk-based approach, when two or more rules conflict with one another, the particular rule whose risk value has a predetermined relationship (e.g., aligns most closely) with the risk level associated with the application then takes precedence. This approach thus provides a mechanism that provides for rule selection that is influenced by a risk assessment. By selecting among conflicting rules based on risk, the potential or actual conflicts are disambiguated, with the result being that the content is filtered appropriately.

There may be many different ways to implement the risk-based rule-selection mechanism of this disclosure. In one example embodiment, the risk level for the application and the risk values associated with the rules are numerical, and the rule selection is based on which of a set of conflicting rules has a value that best aligns to the risk level. In another example embodiment, the risk level for the application is an attribute (e.g., rule granularity) and the risk values associated with the rules are properties (e.g., "high" or "low" granularity); once again, the rule selection is based on which of the set of conflicting rules provides the appropriate degree of granularity. In either case, by selecting among conflicting rules based on risk, the conflicting rules are disambiguated, with the result being that the content is filtered appropriately.

The risk level may also be varied depending on the type of content to be filtered, its source of origin, or other factors. For example, if HTML content comes through an email, the administrator can set a relatively low risk level (because malicious content would only affect the current reader). If, on the other hand, the HTML content is downloaded from a server wiki, the administrator can identify it as relatively high risk (as that content would be available to many users).

According to this approach, conflicting filtering rules (e.g., those created by a whitelist, on the one hand, and a blacklist, on the other hand) are disambiguated. As used herein, disambiguation refers to a process of resolving conflicts (or removing the ambiguity) in the rules when they are applied concurrently (namely, in a single pass). In a preferred embodiment, the technique herein provides for automatic disambiguation of conflicting whitelists and blacklists when those lists are applied simultaneously to a piece of content. This single pass whitelist/blacklist filtering is computationally efficient and resolves rule conflicts in a manner that increases the protection afforded by the content filter.

As described, a conflict between or among content filtering rules is resolved by selecting among conflicting rules based on risk and, in particular, by assessing how a rule's risk value aligns to a "risk level" associated with the application. The application's risk level may be set by an administrator using a configuration tool, or that risk level may be varied automatically or programmatically. The application risk level may be a default or static value, or it may change dynamically based on other factors, such as time of day, user role or group, the nature of the request, the source or location of the request, and many others. In a typical, but non-limiting example, the risk level is set by an administrator to be a numerical value, such as "80%." As any example, the risk level (sometimes referred to herein as "acceptable risk level") may be set by programmatically to "low." Just as the application has an associated risk level, preferably each of the rules in the ruleset that may be applied for content filtering purposes has its own "risk value." The risk value may also be thought of as providing a measure of the rule's security (or security strength). The risk value may be pre-configured, or set automatically or programmatically. A particular risk value may be applied to each rule, or to all rules of a certain type, or in some other manner. A risk value may be a number, or some attribute (e.g. "high," "low," higher granularity," "lower granularity," and the like, or even a combination. As the number of rules increases, it may be desired to apply "risk values" to a group or class or set of rules. A rule may also have a risk value that is a "null" value. A rule value may be static, or it may be dynamic, once again based on factors such as time of day, user role or group, the source or location of the content request, and so forth. Generalizing, an application that is expected to apply the filtering rules has a "risk level" associated therewith, and the filtering rules used by the application (or at least some of them) have associated "risk values." When two or more rules conflict with one another, the risk values are then used (by comparing against the risk level) to determine which of the conflicting rules should take precedence.

How the risk values associated with the rules are applied against the risk level depends on the nature of the values and the risk level. The following provide several example scenarios to describe this process. These examples are meant only to describe the approach generally but should not be taken to limit the subject matter.

In one example, assume that blacklist rules that apply to known keywords have an associated risk value of 70 (i.e., 70% risky). Assume further that the whitelist rules that apply to safe IP addresses have a risk value of 20 (i.e., 20% risky). Then, if the administrator sets the risk level to "low," a whitelist rule of the identified type would take precedence over a blacklist rule of the identified type in the event of a conflict because its value (20%) aligns most closely with the risk level. On the other hand, if the administrator sets the risk level to "high," the blacklist rule would take precedence as its value (70%) aligns most closely with the risk level.

The risk level for the application also may be set to vary depending on one or more variables or factors. As a more specific example involving the 70% and 20% numerical values for the respective blacklist and whitelist rules, assume that the administrator sets the risk level to be 80% for the application with respect to a user's personal email account (which may be insecure), whereas the risk level is set to 30% for the application with respect to a user's corporate email account (which is presumed to have more security). If an email directed to the user's personal email account triggers both rulesets, the blacklist rule would be applied. In contrast, an email directed to the user's corporate email account (if it triggers both rulesets) would be filtered by the whitelist. If the administrator sets an acceptable risk level of, say, 5%, the whitelist would be applied, as it is the closest matching rule.

While configuring/applying numerical values is convenient and provides good filtering results, there may be other more generalized "risk" criteria applied. A representative example of this type might be risk values that are "high" or "low," "high," "medium" or "low," "very high," "high," "average," "low" or "very low," or the like. Of course, the semantics or nomenclature described is merely exemplary. Typically, the risk levels will need to fall along some type of continuum that is linear.

Another type of risk value may be a generalized attribute, such as "granularity." The notion of granularity refers to how "specific" a filtering rule applies to a particular aspect of the content being filtered. In the ACF HTML example scenarios, and as noted above, active content to be filtered can be defined broadly at a tag level, more finely at an attribute level, and more finely still at a value level. An ACF rule thus can have a level of granularity depending on how coarse or fine the filtering is to be applied. This granularity may then be an attribute of the "risk value" that is used for conflicting rules selection. In one example embodiment, the risk value (identified as a degree of granularity) that has a predetermined relationship to the application risk level might then be the rule with the highest granularity. In this example then, A rule with fine granularity has a "risk value" that is lower than that of a rule with coarse granularity. In such case, e.g., the rule with the high granularity has a risk value=low, while the rule with coarse granularity has a risk value=high. Once again, the selection of which rule to pick will then depend on which risk value (of a pair of conflicting rules) has a predetermined relationship (e.g., aligns most closely) with a risk level associated with the application. The risk level may be set by an attribute, or it may be defined explicitly, such as "select a rule with a highest granularity."

Figure 11:
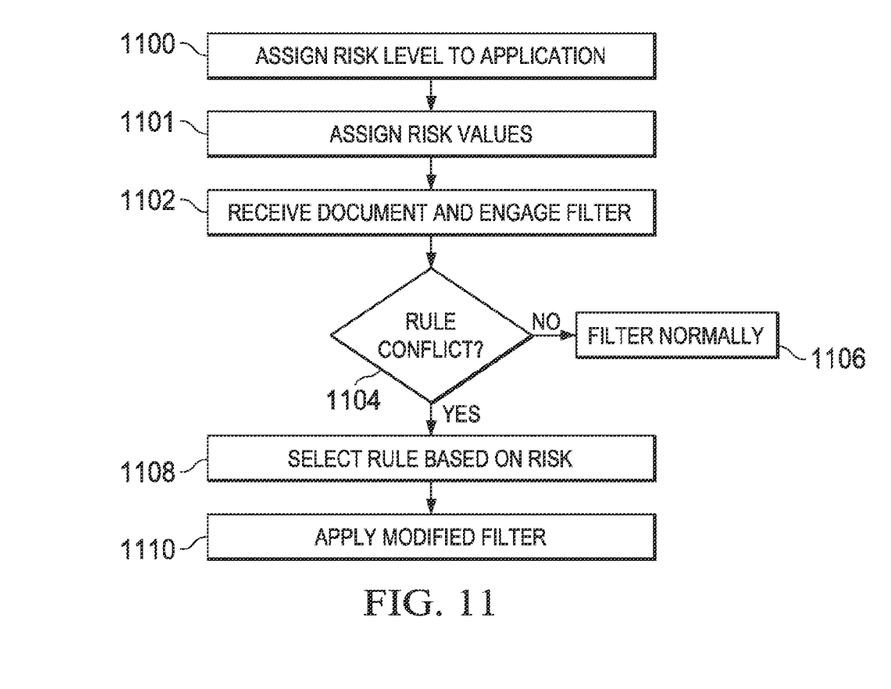
FIG. 11 is a process flow describing the technique for disambiguating conflicting filtering rules according to this disclosure.

FIG. 11 is a process flow illustrating the basic technique of disambiguating rules in a content filter, such as a combined whitelist/blacklist active content filter (ACF). The technique described may be used with any type of content filter in which content filtering rules are applied concurrently (namely, in a single pass). The particular filtering rules are typically at least one whitelist, and at least one blacklist, but this is not a limitation. The approach described herein may be implemented with a pair of whitelist rules, a pair of blacklist rules, or the like. The approach is effective whenever content filtering rules are conflicting (mutually exclusive), in whole or in part, regarding of the reason for such conflict.

The approach begins at step 1100 by associating a risk level to the application. At step 1101, a risk value is associated to the rules in a ruleset. As noted above, the configuring of risk level and risk values may occur manually, automatically, programmatically, statically, dynamically, or the like. The risk level may be varied, and the risk values need not be associated with each rule, but may be applied to sets of rules. Steps 1100 and 1101 may occur off-line, or in any sequence. The levels and values may be changed or modified as separate operations, or at different times, or under different control mechanisms. At step 1102, a document requiring filtering is received and a filter is engaged to perform filtering. In a representative embodiment, the content is HTML and the filter is an active content filter that includes one or more whitelists, together with one or more blacklists. Other types of content and filters may take advantage of the described approach. Preferably, the content filtering rules are evaluated concurrently (simultaneously) in a single pass operation. At step 1104, a test is performed to determine whether there is a rule conflict. If the outcome of the test at step 1104 indicates that there is no rule conflict, the document is passed/blocked, or modified/passed, in the usual manner at step 1106. If, however, there is a rule conflict, the process continues at step 1108. At this step, the ambiguity is resolved by selecting among conflicting rules based on the risk analysis described herein. At step 1110, the selected rule is applied, with the resulting modified document then presented. This completes the processing.

In the "granularity" example scenario described above, and assuming the risk level is set to low, the operation in steps 1108 and 1110 would result in the whitelist rule (FIG. 5) taking precedence over the blacklist rule (FIG. 6). This is because the blacklist rule for "stylesheets" applies to the entire attribute, which is a greater (coarser) scope than the whitelist rule for "ibm.com" URLs, which applies to only a portion of the attribute value.

Other types of risk level information may also be used to influence the selection of a rule when there are conflicts. This additional risk level information may be based on other content-specific indicators. For example, in an email spam filter, high risk indicators would include an unknown sender, or HTML content with attachments. Low risk indicators might include a whitelisted sender, and text-only content. Of course, the risk indicators will vary depending on the type of content, the type of content filter, source and destination, local context, global context, content source and type, role, date or time of day, and other factors. One or more of these indicia comprise a risk level of the content being filtered. These one or more additional or ancillary risk level indicia may be applied to influence the choice of applying a blacklist or whitelist rule in a given scenario. The techniques of this disclosure may be implemented in any type of content filtering system, mechanism, appliance, device, program or process. The method to disambiguate rules (e.g., in a combined whitelist/blacklist content filter) may operate within a local system, or remotely. The approach may be implemented across a conventional client-server based computing environment, within the content of a cloud-based computing environment, or as standalone functionality. The technique may be implemented natively in a particular application (e.g., an email spam filter), or as an adjunct (e.g., a plug-in) to some other functionality such as a web server, an application server, a database server, or the like. The technique may be implemented manually or in an automated manner, potentially based on a set of default granularity rules. The technique may be implemented within any machine, appliance, server, program, process or execution thread.

The above-described subject matter provides many advantages. The approach enables more robust, efficient and accurate content filtering to be applied by an application, regarding of type. The approach enables content filtering (including active content filtering) to use both whitelist and blacklist rules together in a single pass for improved filtering results while addressing the problem of rule conflicts.

As has been described, the functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the conflict rule resolution functionality of this disclosure can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the content filtering (including the rules conflict resolution mechanism of this disclosure) is implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method of protecting a computing device against exploitation by active content downloaded over a network, comprising:
    instantiating an active content filter (ACF) application in association with the computing device;
    associating a risk value to each of a set of content filtering rules implemented by the ACF application;
    associating a risk level to the ACF application that implements the content filtering rules;
    upon receipt of active content, determining whether applying first and second rules of the set of content filtering rules to the active content results in a content filtering ambiguity;
    when applying the first and second rules to the active content results in a content filtering ambiguity, comparing risk values of each of the first and second rules with the risk level of the ACF application and, in response to the comparison, selecting one of the first and second rules whose risk value has a predetermined relationship to the risk level of the ACF application to thereby provide an improved ACF application; and
    applying the selected one of the first and second rules to filter the active content to enhance protection of the computing device against exploitation by the active content.

2. The method as described in claim 1 further including:
    modifying the risk level of the application based on one of: a content type, a time of day, a user role or group, a request type, and a request source.

3. The method as described in claim 1 wherein risk values associated with the first and second rules define a relative security strength.

4. The method as described in claim 1 wherein risk values associated with the first and second rules define a relative granularity.

5. The method as described in claim 1 wherein first rule is associated with a whitelist and the second rule is associated with a blacklist.

6. The method as described in claim 1 wherein the first and second rules are applied concurrently in a single pass filtering operation.

7. A computing device apparatus, comprising:
    a processor;
    computer memory holding computer program instructions executed by the processor to protect the computer device apparatus against exploitation by active content downloaded over a network by the following operations:
        instantiating an active content filter (ACF) application in association with the computing device;
        associating a risk value to each of a set of content filtering rules implemented by the ACF application;
        associating a risk level to the ACF application that implements the content filtering rules;
        upon receipt of active content, determining whether applying first and second rules of the set of content filtering rules to the active content results in a content filtering ambiguity;
        when applying the first and second rules to the active content results in a content filtering ambiguity, comparing risk values of each of the first and second rules with the risk level of the ACF application and, in response to the comparison, selecting one of the first and second rules whose risk value has a predetermined relationship to the risk level of the ACF application to thereby provide an improved ACF application; and
        applying the selected one of the first and second rules to filter the active content to enhance protection of the computing device against exploitation by the active content.

8. The apparatus as described in claim 7 wherein the operations further include:
    modifying the risk level of the application based on one of: a content type, a time of day, a user role or group, a request type, and a request source.

9. The apparatus as described in claim 7 wherein risk values associated with the first and second rules define a relative security strength.

10. The apparatus as described in claim 7 wherein risk values associated with the first and second rules define a relative granularity.

11. The apparatus as described in claim 7 wherein first rule is associated with a whitelist and the second rule is associated with a blacklist.

12. The apparatus as described in claim 7 wherein the first and second rules are applied concurrently in a single pass filtering operation.

13. A computer program product in a non-transitory computer readable medium for use in a computing device, the computer program product holding computer program instructions which, when executed by the computing device, perform a method of protecting the computing device against exploitation by active content downloaded over a network, the method comprising:
    instantiating an active content filter (ACF) application in association with the computer device;
    associating a risk value to each of a set of content filtering rules implemented by the ACF application;
    associating a risk level to the ACF application that implements the content filtering rules;
    upon receipt of active content, determining whether applying first and second rules of the set of content filtering rules to the active content results in a content filtering ambiguity;
    when applying the first and second rules to the active content results in a content filtering ambiguity, comparing risk values of each of the first and second rules with the risk level of the ACF application and, in response to the comparison, selecting one of the first and second rules whose risk value has a predetermined relationship to the risk level of the ACF application to thereby provide an improved ACF application; and
    applying the selected one of the first and second rules to filter the active content to enhance protection of the computing device against exploitation by the active content.

14. The computer program product as described in claim 13 wherein the method further includes:
    modifying the risk level of the application based on one of: a content type, a time of day, a user role or group, a request type, and a request source.

15. The computer program product described in claim 13 wherein risk values associated with the first and second rules define a relative security strength.

16. The computer program product as described in claim 13 wherein risk values associated with the first and second rules define a relative granularity.

17. The computer program product as described in claim 13 wherein first rule is associated with a whitelist and the second rule is associated with a blacklist.

* * * * *